(12) United States Patent
Giai et al.

(10) Patent No.: US 7,164,265 B2
(45) Date of Patent: Jan. 16, 2007

(54) BEARING ASSEMBLY WITH ROTATION SENSING DEVICE

(75) Inventors: Bruno Giai, Abbadia Alpina (IT); Alexander Molenaar, Kamerik (NL); Simona Pilone, Rivoli (IT); Simon Van Ballegooij, Wijk Bij Duurstede (NL)

(73) Assignee: Aktiebolaget SKF, Gothenburg (SE)

( * ) Notice: Subject to any disclaimer, the term of this patent is extended or adjusted under 35 U.S.C. 154(b) by 218 days.

(21) Appl. No.: 10/883,307

(22) Filed: Jun. 30, 2004

(65) Prior Publication Data

US 2005/0017586 A1    Jan. 27, 2005

(30) Foreign Application Priority Data

Jul. 9, 2003    (IT)    .......................... TO2003A0528

(51) Int. Cl.
 *G01B 7/30* (2006.01)
 *G01P 3/44* (2006.01)
(52) U.S. Cl. .................. 324/174; 324/207.25; 384/448
(58) Field of Classification Search ........... 324/207.12, 324/207.2, 207.21, 207.25, 166, 173, 174; 384/448

See application file for complete search history.

(56) References Cited

U.S. PATENT DOCUMENTS 3,535,618 A * 10/1970 Perrins ........................ 323/362
3,780,313 A * 12/1973 Wiegand ..................... 307/106
3,852,717 A    12/1974 Hosaka et al.
4,045,738 A *  8/1977 Buzzell ....................... 324/174

FOREIGN PATENT DOCUMENTS

EP    0 745 857 A1    12/1996
WO    00/23779    4/2000

* cited by examiner

*Primary Examiner*—Jay M. Patidar
(74) *Attorney, Agent, or Firm*—Merchant & Gould P.C.

(57) ABSTRACT

A bearing unit for a vehicle wheel hub is associated with a rotation sensing device and an electromagnetic inductive coupling. The rotation sensing device comprises an impulse ring (18) secured for rotation with the rotatable race (13) of the bearing unit by means of a rotatable annular carrier (19), and a magnetic/electric transducer (20) mounted to the stationary race (12) of the bearing unit by means of a stationary annular carrier (21) and operatively facing the impulse ring (18). The electromagnetic inductive coupling comprises a stationary coil (24) electrically connectable to a power supply (32) and carried by the stationary annular carrier (21), and a rotatable coil (25) electrically connectable (26) to an electric or electronic device mounted on the wheel. The rotatable coil (25) is carried by the rotatable annular carrier (19) and is electromagnetically linked to the stationary coil (24).

12 Claims, 1 Drawing Sheet

BEARING ASSEMBLY WITH ROTATION SENSING DEVICE

The present invention refers to a bearing assembly for the hub of a motor vehicle wheel fitted with a rotation sensing device and an electromagnetic coupling for transferring power and data to and from the rotatable and the stationary parts of a bearing unit.

Bearing assemblies fitted with rotation sensing devices are known in the art. An impulse ring or tone wheel, usually a magnetized ring (see, for example, EP-0 745 857), is mounted fast for rotation to a rotatable member to be kept under control, for example a drive shaft or a wheel hub. It is known to use, as a magnetized ring, a plastoferrite ring magnetically polarized so as to form a succession of circumferentially alternate and/or spaced north/south poles. The impulse ring operatively faces an associated magnetic/electric transducer mounted to a stationary member. When the rotatable member rotates, the magnetic flux linked by the transducer varies as the magnetized zones pass in front of the transducer, which supplies electric pulses indicative of rotation data (angular position, speed, acceleration, etc.). The electric signals provided by the transducer are transmitted to an electronic processing unit mounted on board of the vehicle and processed so as to obtain information on the motion of the rotatable member.

U.S. Pat. No. 3,852,717 discloses a device for automatically detecting the loss of pressure and the abnormal increase of temperature within a pneumatic tire of a vehicle. Pressure and temperature switches are connected in series to an electromagnetic coupling comprising a primary coil and a secondary coil. The primary coil is mounted on a stationary journal member supporting the rotating axle. The secondary coil is secured concentrically on an axle for rotation therewith and is electrically connected in series with the switches.

WO 00/23779 discloses a bearing assembly with an integral transformer. A first coil is mounted to a stationary race of the bearing, and a second coil is mounted to a rotatable race. The first and second coils are close to one another such that the magnetic flux generated by the stationary coil links the second coil. As a result of the mutual electromagnetic coupling between the first and the second coil, it is possible to transmit electrical signals to a circuit mounted on a rotary part of the wheel.

In view of the foregoing background, it is an object of the invention to provide an improved bearing assembly of compact design, reliable, and allowing to transfer power and data to and from the wheel and the chassis of a motor vehicle.

The above and other objects, that will be better understood herein after, are attained in accordance with the invention by a bearing assembly as defined in the appended claims.

Figure 1:
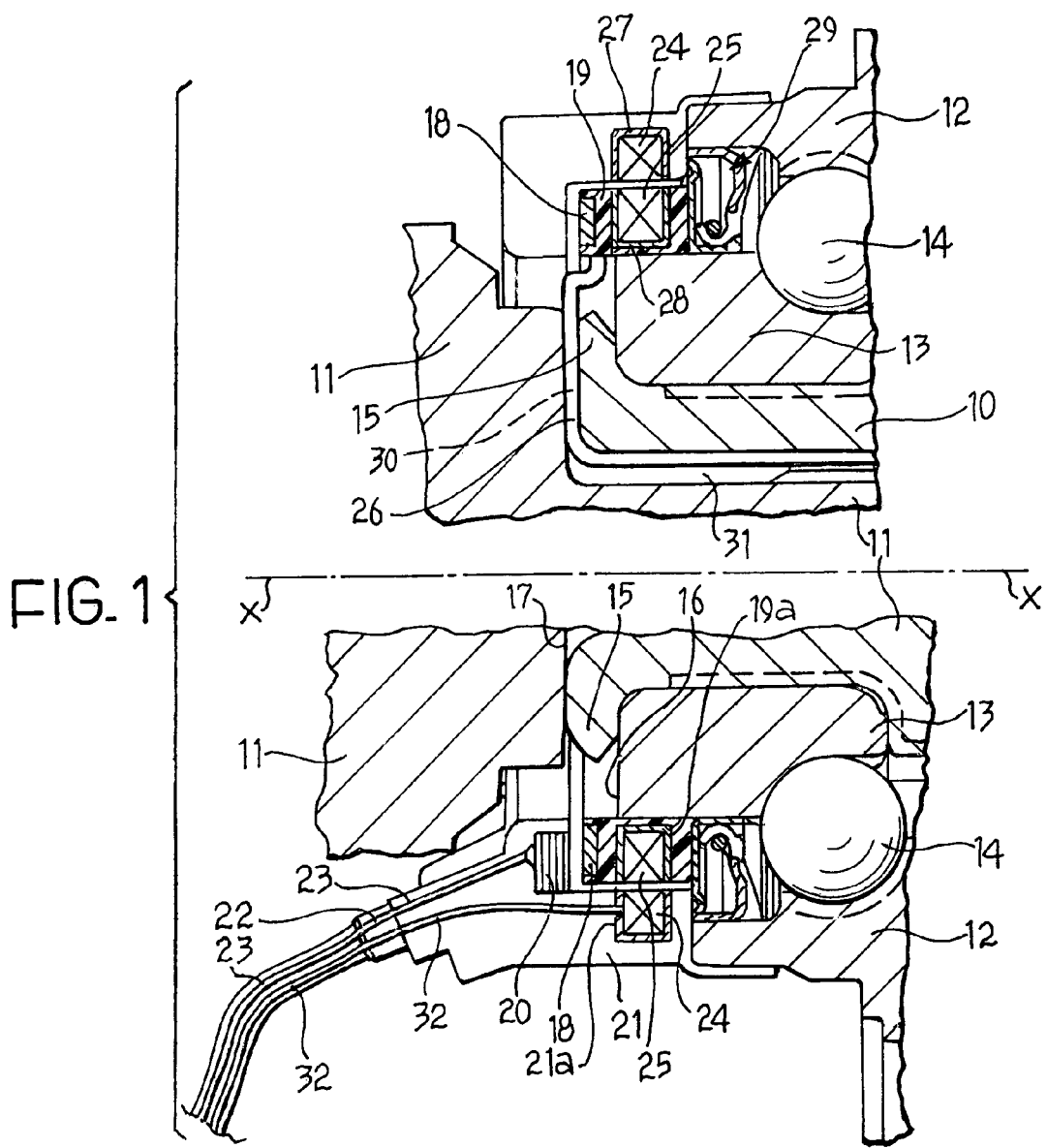
Figure 2:
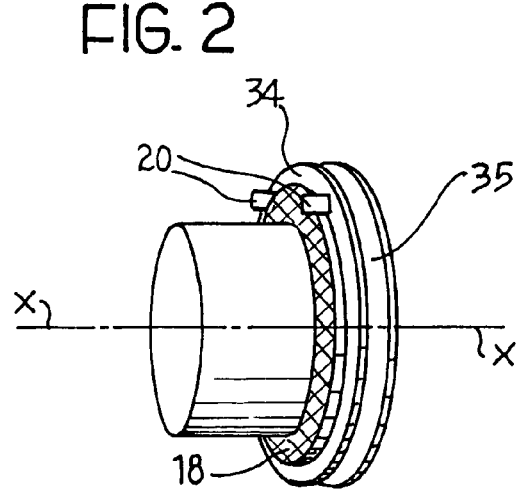

The features and advantages of the invention will become apparent from the following detailed specification of two preferred embodiments of the bearing assembly, given by way of examples. Reference is made to the accompanying drawings, in which:

FIG. 1 is a partial, axial cross-sectional view of a bearing assembly according to a first embodiment of the invention, and FIG. 2 is a schematic perspective view showing an alternative arrangement of coils, sensors and an impulse ring integrated in a bearing assembly in accordance with the invention.

With reference to the drawing, numeral 10 designates a tubular portion of a rotatable hub for a motor vehicle wheel fast for rotation with a constant velocity joint 11. The hub 10 is equipped with a bearing unit comprising a radially outer stationary race 12 fixed to a suspension standard (not shown), a radially inner rotatable race 13 and rolling bodies 14, in this example bearing balls, interposed between the stationary and rotatable bearing races. The inner race 13 is axially locked onto the hub 10 by cold forming the axial end of the tubular hub portion 10 so as to form a radially outwardly protruding edge 15 abutting a radial surface or side 16 of the rotatable race 13, which preloads the bearing unit axially and takes away any axial play between the bearing components. The constant velocity joint has a radial surface 17 abutting the end edge 15 of the hub (see the lower half of the FIG. 1). As used herein, terms such as "radial" and "axial" are to be construed with reference to the axis x of rotation of the bearing.

The bearing assembly is equipped with a rotation sensing device. An impulse ring 18, preferably a magnetized ring of known design, is mounted to the rotatable race 13 by means of an annular carrier 19 made of a non ferromagnetic material. The impulse ring 18 is mounted axially facing a magnetic/electric transducer or sensor 20, preferably a Hall sensor, located in a sensor carrier 21 of annular shape, made of a non ferromagnetic material and secured to the stationary outer race 12.

Since speed sensing devices are per se well known, further description is believed unnecessary herein. Suffice it here to say that as the wheel and the rotatable race(s) revolve, the impulse ring 18 moves past the electromagnetic transducer 20. The magnetic flux generated by the moving poles is linked by the transducer 20 and causes this transducer to generate an output signal in form of electric pulses indicative of the rotational movement of the wheel. The electric pulses emitted by the transducer are transmitted through a data transmitting wire 22 to an on-board processing unit to obtain information on the rotation data of the wheel. A power wire 23 is used to transmit power from the vehicle battery (not shown) to the sensor (transducer) 20.

The bearing assembly includes an inductive coupling constituting a rotary transformer for performing a number of functions, as specified in the following. The inductive coupling is comprised of a first coil 24 secured to the stationary sensor carrier 21 and a second coil 25 mounted to the same annular carrier 19 supporting the impulse ring 18 so as to be fast for rotation with the rotatable inner race 13 of the bearing.

A power wire 32 supplies electric current from the vehicle battery to the first, stationary coil 24. The second, rotatable coil 25 is connected in series through a cable 26 for instance to switches (not shown, or sensors or other electric/electronic devices requiring power supply) mounted on the wheel for monitoring important operational parameters either relating directly to the tires, such as temperature or air pressure, or concerning other quantities, such as for example load sensing devices.

The first coil 24 and the second coil 25 are as close as possible to one another, so that the magnetic flux generated by either coil magnetically links the other coil. As a result of the mutual electromagnetic coupling of the two coils it is possible to transmit electrical signals from the first coil 24 to the second coil 25 and vice versa. The mutual coupling of the first coil 24 and the second coil 25 is, as is known to those skilled in the art, dependent on the surface taken up by the two coils and the number of windings in each coil. By choosing the dimensions and the number of windings correctly it is possible to achieve a strong electromagnetic coupling in a broad frequency range. In the embodiment shown in FIG. 1, the two coils 24, 25 are disposed facing one another coaxially with respect to the axis of rotation x of the bearing.

Preferably, each coil 24, 25 is accommodated in a respective circumferential groove 21a, 19a, formed in each of the annular carriers 21, 19, and a thin foil of ferrite 27, 28 is interposed between each coil and the respective carrier in order to shield the coils magnetically to avoid electromagnetic pollution from the outside.

The coils 24, 25 are located in close proximity to a sealing device of known kind, indicated overall 29, for sealing the gap between the outer 12 and inner 13 races of the bearing unit. It will be appreciated that the coils 24, 25 and the speed sensing device are contained within the axial dimension of the bearing unit, which results in the bearing assembly having a compact design. Furthermore, by arranging the coils within the annular carriers 19 and 21, a labyrinth seal is provided which prevents dirt and other contaminating agents, such as grease and metal particles coming from the near brakes, from gaining access to and depositing on the coils.

The cable 26 connecting the rotatable coil 25 to the switches (or sensors or other electric/electronic devices) mounted on the wheel is passed through a radial passage 30 formed at the interface between the constant velocity joint 11 and the outwardly radially deformed edge 15 of the hub. Radial passage 30 is conveniently obtained by machining the hub edge portion 15. From here, the cable 26 runs along an axial slot 31 formed at the cylindrical interface between the tubular hub portion 10 and the constant velocity joint 11, and reaches said switches in order to supply them with electric current and transfer the data signals emitted by the switches back to the rotatable coil 25. These electric signals are transmitted by the inductive coupling from the second, rotatable coil 25 back to the first, stationary coil 24 and delivered from here to the on-board processing unit through the same wire 32 supplying power to the first coil 24. It should be noted that, as known to those skilled in the art, the transmission of the sensed pressure and temperature signals may alternatively take place through a separate conductor.

In the alternative embodiment of FIG. 2, which provides a very compact design, the stationary and rotatable coils are facing each other axially (instead of radially), whereby the electromagnetic coupling is axial. Each coil is located or engraved in a respective printed circuit board 34, 35, that can be either rigid or flexible, preferably with thin foils of ferrite (not shown in FIG. 2 but similar to those designated at 27 and 28 in FIG. 1) interposed between each coil and its printed circuit board so as to avoid electromagnetic pollution from and to the outside. The rotating printed circuit board 35 and the impulse ring 18 are mounted on a same annular carrier of non ferromagnetic material (19, not shown in FIG. 2). The magnetic/electric transducers or Hall sensors 20 (in the example of FIG. 2 two Hall sensors are provided), are mounted directly on the stationary printed circuit board 34 so as to face the north an south poles of the impulse ring 18 radially.

While specific embodiments of the invention have been disclosed, it is to be understood that such disclosure has been merely for the purpose of illustration and that the invention is not to be limited in any manner thereby. Various modifications as to the shape and location of parts, and constructional and functional details will be apparent to those skilled in the art in view of the foregoing examples.

What is claimed is:

1. A bearing assembly for the hub of a motor vehicle wheel, comprising:
   a bearing unit with at least one rotatable race, a stationary race, and rolling bodies radially interposed between the races;
   a rotation sensing device with
   an impulse ring secured for rotation with the rotatable race by means of a rotatable annular carrier, and
   a magnetic/electric transducer mounted to the stationary race by means of a stationary annular carrier and operatively facing the impulse ring;
   an electromagnetic inductive coupling, including
   a stationary coil electrically connectable to a power supply means and carried by the stationary annular carrier, and
   a rotatable coil electrically connectable to at least one electric or electronic device mounted on the wheel, the rotatable coil being carried by the rotatable annular carrier and being electromagnetically linked to the stationary coil, wherein the rotatable coil is electrically connectable to said wheel-mounted electric or electronic device through electrically conductive means,
   wherein the assembly is mounted onto an axial tubular portion of a wheel hub having an end portion abutting a radial shoulder of a constant velocity joint, wherein the electrically conductive means pass through a radial passage formed at the interface between the constant velocity joint and the end portion of the hub.

2. The bearing assembly of claim 1, wherein the end portion of the hub is a radially outwardly protruding edge cold formed against a radial surface of the rotatable race so as to axially lock the bearing unit onto the hub, and wherein the radial passage is obtained by machining the hub edge portion.

3. A bearing assembly for the hub of a motor vehicle wheel, comprising:
   a bearing unit with at least one rotatable race, a stationary race, and rolling bodies radially interposed between the races;
   a rotation sensing device with
   an impulse ring secured for rotation with the rotatable race by means of a rotatable annular carrier, and
   at least one magnetic/electric transducer mounted to the stationary race by means of a stationary annular carrier and operatively facing the impulse ring;
   an electromagnetic inductive coupling, including
   a stationary coil electrically connectable to a power supply means and carried by the stationary annular carrier, and
   a rotatable coil electrically connectable to at least one electric or electronic device mounted on the wheel, the rotatable coil being carried by the rotatable annular carrier and being electromagnetically linked to the stationary coil, wherein the rotatable coil is electrically connectable to said wheel-mounted electric or electronic device through electrically conductive means, wherein the electrically conductive means pass through an axial slot formed at the cylindrical interface between an axial tubular hub portion and a constant velocity joint.

4. The bearing assembly of claim 3, wherein the stationary and rotatable coils are mounted closely to one side of the bearing unit.

5. The beating assembly of claim 3, wherein the stationary and rotatable coils are mounted coaxial to one another.

6. The bearing assembly of claim 3, wherein the stationary and rotatable coils are carried by said respective carriers so as to face one another axially.

7. The bearing assembly of claim 6, wherein said first and second coils are mounted in a respective stationary and rotatable printed circuit board carried by said stationary and rotatable carriers, respectively.

8. The bearing assembly of claim 7, wherein at least one said transducer is mounted on the stationary printed circuit board.

9. The bearing assembly of claim 3, wherein each coil is accommodated in a respective circumferential groove formed in each of the annular carriers.

10. The bearing assembly of claim 3, wherein a foil of electromagnetic shielding material is coupled to each coil so as to avoid electromagnetic pollution from and to the outside.

11. The bearing assembly of claim 10, wherein said electromagnetic shielding material is ferrite.

12. The bearing assembly of claim 3, wherein the carriers are made of non-ferromagnetic material.

* * * * *